(12) United States Patent
Park et al.

(10) Patent No.: US 7,648,245 B2
(45) Date of Patent: Jan. 19, 2010

(54) COOLING SYSTEM OF THIN PROJECTOR AND METHOD FOR CONTROLLING THE SAME

(75) Inventors: Yong Soo Park, Yangju-si (KR); Dae Woo Kim, Seoul (KR); Ki So Bok, Seoul (KR); Hyung Jin Lim, North York (CA)

(73) Assignee: LG Electronics, Inc., Seoul (KR)

( * ) Notice: Subject to any disclaimer, the term of this patent is extended or adjusted under 35 U.S.C. 154(b) by 476 days.

(21) Appl. No.: 11/341,898

(22) Filed: Jan. 30, 2006

(65) Prior Publication Data

US 2006/0290895 A1 Dec. 28, 2006

(30) Foreign Application Priority Data

| Mar. 30, 2005 | (KR) | 10-2005-0026309 |
| Mar. 30, 2005 | (KR) | 10-2005-0026321 |
| Sep. 5, 2005 | (KR) | 10-2005-0082366 |

(51) Int. Cl.
*G03B 21/16* (2006.01)

(52) U.S. Cl. .................................. 353/52; 348/748
(58) Field of Classification Search .................. 353/52, 353/53, 54, 55, 56, 57, 58, 59, 60, 61; 348/748, 348/749
See application file for complete search history.

(56) References Cited

U.S. PATENT DOCUMENTS

| 2,509,889 | A | * | 5/1950 | Shockley ...................... 73/179 |
| 5,136,397 | A | * | 8/1992 | Miyashita ................... 348/748 |
| 5,666,171 | A | | 9/1997 | Nakamura et al. ............ 349/58 |
| 6,007,205 | A | * | 12/1999 | Fujimori ...................... 353/57 |
| 6,127,663 | A | * | 10/2000 | Jones ......................... 219/553 |
| 6,280,038 | B1 | | 8/2001 | Fuse et al. .................... 353/57 |
| 6,322,218 | B1 | * | 11/2001 | Sugawara et al. ............. 353/52 |
| 6,398,366 | B1 | | 6/2002 | Hara et al. .................... 353/57 |
| 6,472,828 | B1 | * | 10/2002 | Pruett et al. ................. 315/225 |
| 6,554,432 | B2 | * | 4/2003 | Ohfune et al. ................ 353/57 |
| 6,679,607 | B2 | | 1/2004 | Gulliksen .................... 353/61 |
| 6,709,111 | B2 | * | 3/2004 | Hirao et al. ................... 353/52 |
| 6,710,762 | B1 | * | 3/2004 | Hasegawa .................. 345/101 |
| 6,739,831 | B2 | * | 5/2004 | Hsu et al. ..................... 415/60 |
| 6,776,489 | B2 | * | 8/2004 | Suzuki ........................ 353/20 |
| 6,890,078 | B2 | * | 5/2005 | Koide .......................... 353/31 |

(Continued)

OTHER PUBLICATIONS

International Search Report.

*Primary Examiner*—William C Dowling
*Assistant Examiner*—Bao-Luan Le
(74) *Attorney, Agent, or Firm*—KED & Associates, LLP

(57) ABSTRACT

A cooling system of a thin projector, and a method for controlling the same are disclosed. The system comprises a heat source 1 in a housing, first and second suction ports formed at side and lower surfaces of the housing, respectively, a discharge port formed at an upper surface of the housing, first and second air stream forming units 2 and 3 to form first and second air stream along which air induced from the first and second suction ports is guided to the discharge port while cooling the heat source, respectively, a sensor unit to detect a temperature of suction air induced from the first and second suction ports and a temperature of discharge air discharged from the discharge port, and a controller 6 to control the first and second air stream forming units 2 and 3 using the temperatures of the suction and discharge air.

21 Claims, 3 Drawing Sheets

U.S. PATENT DOCUMENTS

| | | | |
|---|---|---|---|
| 6,966,652 B1* | 11/2005 | Lai et al. | 353/52 |
| 7,008,061 B2* | 3/2006 | Yano | 353/57 |
| 7,036,939 B2* | 5/2006 | Cole et al. | 353/52 |
| 7,040,762 B2* | 5/2006 | Yasuda | 353/52 |
| 7,048,382 B2* | 5/2006 | Pate | 353/52 |
| 7,055,966 B2* | 6/2006 | Momose et al. | 353/97 |
| 7,075,596 B2* | 7/2006 | Hosoda | 349/72 |
| 7,086,739 B2* | 8/2006 | Kida et al. | 353/52 |
| 7,237,904 B2* | 7/2007 | Hsu et al. | 353/52 |
| 7,258,446 B2* | 8/2007 | Jayaram et al. | 353/52 |
| 2002/0041362 A1 | 4/2002 | Nakano et al. | 353/31 |
| 2002/0075457 A1* | 6/2002 | Wang et al. | 353/61 |
| 2002/0163626 A1* | 11/2002 | Takizawa et al. | 353/52 |
| 2003/0095237 A1* | 5/2003 | Terami et al. | 353/57 |
| 2003/0216882 A1* | 11/2003 | Lai et al. | 702/132 |
| 2004/0027545 A1* | 2/2004 | Yokoyama et al. | 353/52 |
| 2004/0080717 A1* | 4/2004 | Pate | 353/52 |
| 2004/0189953 A1* | 9/2004 | Wu et al. | 353/58 |
| 2004/0212784 A1* | 10/2004 | Hsu | 353/61 |
| 2004/0239887 A1* | 12/2004 | Yasuda | 353/57 |
| 2004/0263797 A1* | 12/2004 | Russell et al. | 353/57 |
| 2005/0019162 A1* | 1/2005 | Delano et al. | 416/1 |
| 2005/0200814 A1* | 9/2005 | Hsu et al. | 353/52 |
| 2006/0152684 A1* | 7/2006 | Lin et al. | 353/58 |
| 2006/0164602 A1* | 7/2006 | Jayaram et al. | 353/57 |
| 2006/0215124 A1* | 9/2006 | Seo | 353/52 |
| 2006/0291994 A1* | 12/2006 | Bok et al. | 415/47 |
| 2007/0024819 A1* | 2/2007 | Halls et al. | 353/58 |
| 2007/0211221 A1* | 9/2007 | Yang et al. | 353/52 |
| 2008/0030689 A1* | 2/2008 | Hsu | 353/57 |

* cited by examiner

COOLING SYSTEM OF THIN PROJECTOR AND METHOD FOR CONTROLLING THE SAME

This application claims the benefit of Korean Patent Applications No. 10-2005-0026309 filed on Mar. 30, 2005, No. 10-2005-0026321 filed on Mar. 30, 2005 and No. 10-2005-0082366 filed on Sep. 05, 2005, which is hereby incorporated by reference as if fully set forth herein.

BACKGROUND OF THE INVENTION

1. Field of the Invention

The present invention relates to a thin projector, and more particularly, to a cooling system of a thin projector and a method for controlling the same.

2. Discussion of the Related Art

The recent tendency of display devices is to provide a large screen size as well as lightness and thinness. Of such display devices, projectors have been greatly highlighted because they can realize a large screen of 100 inches or more.

Such a projector is a display device which projects an image generated from a micro device such as a liquid crystal display (LCD) panel, a liquid crystal on silicon (LCOS) panel or a digital micromirror device (DMD) panel, onto a screen, thereby displaying the image.

Generally, such a projector is classified into a single panel type, a double panel type, or a triple panel type in accordance with the number of micro devices used in the projector.

In a single panel type projector, white light is separated into color light components in a time-division manner, and the separated color light components are illuminated to a single micro device. In a two-panel type projector, white light is separated into color light components in a space-division and time-division manner, and the color light components are illuminated to two micro devices. In a three-panel type projector, white light is separated into color light components in a space-division manner, and the color light components are illuminated to three micro devices.

The conventional projector generally has a rectangular hexahedral appearance such that the top/bottom side thereof has an area larger than that of the front side thereof where a projection lens unit is arranged.

As a result, the conventional projector has a problem in that there is a limitation to the installation space of the projector because an increased space must be provided in rear of the front side of the projector where the projection lens unit is arranged.

In order to solve this problem, conventional projectors use an optical system configured to bend the path of light using mirrors. In such projectors, however, there is still a limitation in reducing the projector thickness.

Accordingly, a thin projector has been developed, wherein the projection lens unit and other optical components are vertically arranged in a panel-shaped housing.

However, with regard to the thin projector, there is an urgent need in the art to provide a cooling system for such a thin projector, and a method for controlling the cooling system.

This is attributed to the fact that, although image display capability is a fundamental requirement for the projector, cooling capability and reduction of noise caused by driving of the fans are also major factors to support the image display capability of the projector.

SUMMARY OF THE INVENTION

Accordingly, the present invention is directed to a cooling system of a thin projector, and a method for controlling the same that substantially obviates one or more problems due to limitations and disadvantages of the related art.

An object of the present invention is to provide cooling system of cooling system of a thin projector, and a method for controlling the same, which can minimize noise of a cooling fan while ensuring efficient cooling of heat sources in consideration of structural characteristics of the thin projector.

Another object of the present invention is to provide a cooling system of a thin projector, and a method for controlling the same, which can efficiently cool the system through control of rotating speeds of cooling fans according to a height of the system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a cooling system for a thin projector comprises: heat sources received in a housing and generating heat; first and second suction ports formed at side and lower surfaces of the housing, respectively; a discharge port formed at an upper surface of the housing; a first air stream forming unit to form a first air stream along which air induced from the first suction port is guided to the discharge port to cool the heat sources; a second air stream forming unit to form a second air stream along which air induced from the second suction port is guided to the discharge port to cool the heat sources; a sensor unit to detect a temperature of suction air induced from the first and second suction ports and a temperature of discharge air discharged from the discharge port; and a controller to control the first and second air stream forming units depending on the temperatures of air measured by the sensor unit.

The first air stream forming unit may comprise at least one fan positioned in the first air stream, and the second air stream forming unit may comprise at least one fan positioned in the second air stream. Here, the first air stream forming unit may comprise a first fan positioned adjacent to a projection lens unit at an upper portion of the housing to form an upper air stream in the housing, and a second fan positioned adjacent to the projection lens unit at a lower portion of the housing to form a lower air stream in the housing. In addition, the second air stream forming unit may comprise a third fan positioned between a light source among the heat sources and the second suction port to form a vertical air stream from the lower portion to the upper portion of the housing, and a fourth fan positioned at one side of the third fan to form a bypass air stream from the lower portion to the upper portion of the housing so as to bypass the light source.

The sensor unit may comprise a first temperature sensor to measure the temperature of suction air induced from the first and second suction ports, and a second temperature sensor to measure the temperature of discharge air discharged from the discharge port.

The controller may comprise a detection unit to detect the temperature of the suction air induced from the first and second suction ports and the temperature of the discharge air discharged from the discharge port; a temperature difference calculating unit to calculate a temperature difference between the suction air and the discharge air; a height determining unit to determine a height of the system through comparison of the calculated temperature difference with a preset reference for determining the height; a memory to store information about rotating speeds of the first and second air stream forming units according to the height; a speed determining unit to determine the rotating speeds of the first and second air stream forming units according to the height by using the information stored in the memory; and a driving unit to drive the first and second air stream forming units according to the determined rotating speeds.

In another aspect of the present invention, provided herein is a method for controlling a cooling system of a thin projector, comprising the steps of: detecting a temperature of suction air induced from first and second suction ports and a temperature of discharge air discharged from a discharge port; calculating a temperature difference between the suction air and the discharge air; determining a height of the system via the calculated temperature difference; determining rotating speeds of first and second air stream forming units according to the determined height and the temperature of the suction air; and driving the first and second air stream forming units according to the determined rotating speeds to cool heat sources.

The method may further comprise: turning the system on; initializing the system; determining whether or not a maximum heat generating period of the heat sources has passed, before the step of detecting the temperatures of the suction air and the discharge air.

Preferably, at the step of initializing the system, the height of the system is set to an initial value of 0, and the first and second air stream forming units are driven at a lowest rotating speed.

At the step of determining whether or not the maximum heat generating period of the heat sources has passed, if the maximum heat generating period has not passed, the first and second air stream forming units are driven at the preset lowest speed, and if the maximum heat generating period has passed, the temperatures of the suction air and the discharge air are detected.

The method may further comprise: determining whether or not the calculated temperature difference is a temperature difference enabling normal cooling, and if the calculated temperature difference is a temperature difference enabling the normal cooling, determining whether or not the temperature of the suction air is lowered, before determining the height of the system with the calculated temperature difference.

At this time, preferably, at the step of determining whether or not the calculated temperature difference is the temperature difference enabling the normal cooling, if the calculated temperature difference is not the temperature difference enabling the normal cooling, the system is turned off.

At the step of determining whether the temperature of the suction air is lowered, if the temperature of the suction air is lowered, the step of detecting the temperatures of the suction air and the discharge air is repeated, and if the temperature of the suction air is not lowered, the temperature difference between the suction air and discharge air is calculated.

Preferably, the height of the system is determined after the maximum heat generating period of the heat sources has passed, and the height of the system is determined depending on first and second preset references for determining the height of the system.

The step of determining the rotating speeds of the first and second air stream forming units may comprise determining a height-related temperature range corresponding to the determined height and the temperature of the suction air using a height-related temperature range table; determining whether or not a currently determined temperature range is different from a previously determined temperature range; if the currently determined temperature range is different from the previously determined temperature range, determining the rotating speeds corresponding to the height and the temperature range using a height and temperature range-related rotating speed duty ratio table; and determining whether the rotating speeds must be increased or decreased through comparison of current rotating speeds with previous rotating speeds.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The concept of the present invention lies in efficient cooling of heat sources, which constitute an optical system in a thin projector so as to further reduce the thickness of the thin projector.

A cooling system of the thin projector in accordance with one embodiment of the invention will be described hereinafter with reference to FIG. 1.

Figure 1:
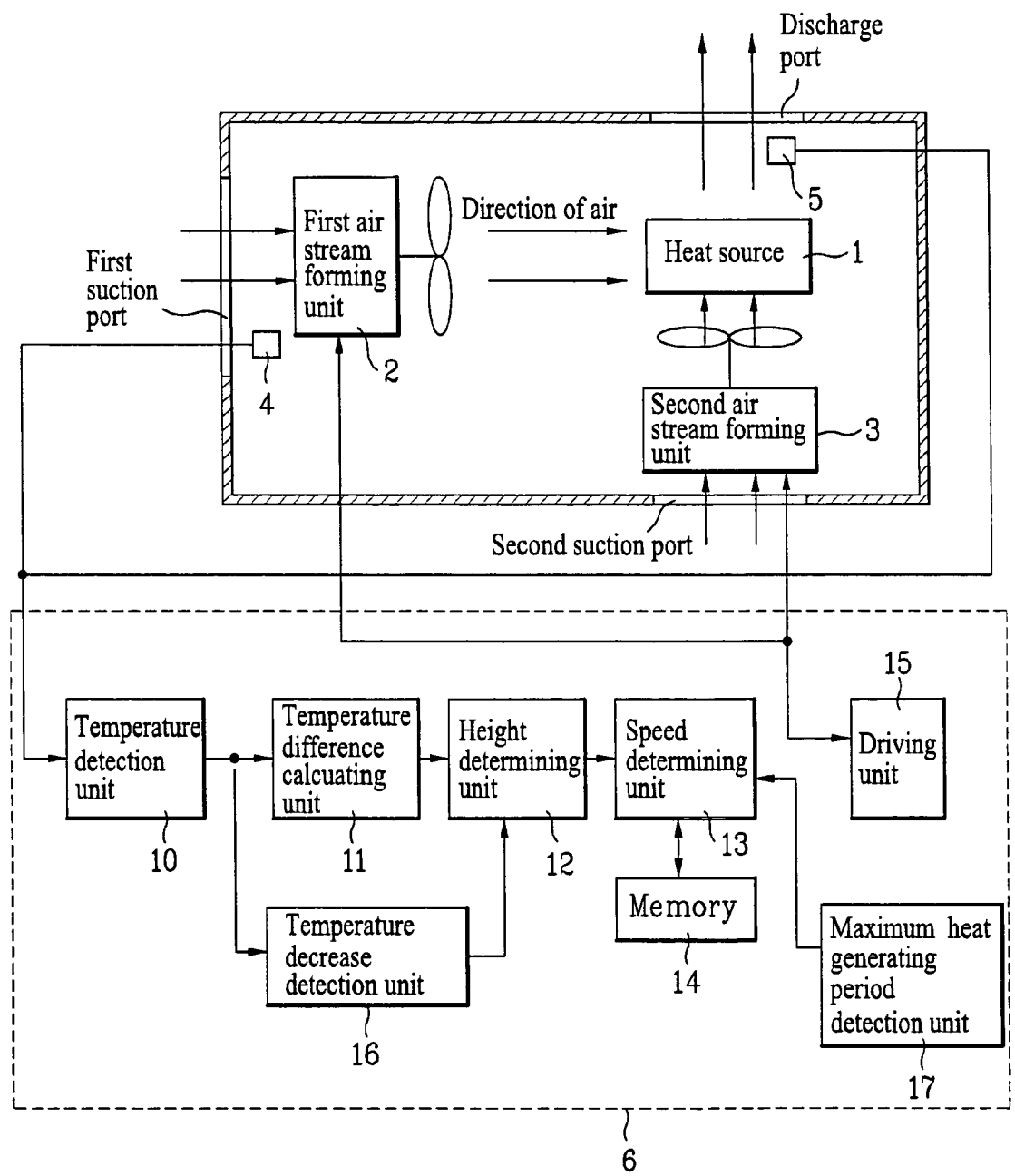
FIG. 1 is a schematic diagram illustrating a cooling system of a thin projector in accordance with one embodiment of the present invention.

Referring to FIG. 1, the cooling system of the invention is contained in a housing of the thin projector, and comprises a heat source 1, first and second suction ports, a discharge port, first and second air stream forming units 2 and 3, a sensor unit including first and second temperature sensors 4 and 5, and a controller 6.

The heat source 1 may include a light source, a circuit unit, a display including micro devices, a color wheel driving unit, etc. In this regard, only the light source is shown as the heat source 1 in FIG. 1.

The first suction port can be formed at one of side surfaces of the housing, and the second suction port can be formed at a lower surface of the housing.

Preferably, the discharge port is formed at an upper surface of the housing.

The purpose of these constructions will be described as follows.

The first air stream forming unit 2 forms a first air stream along which air induced from the first suction port is guided to the discharge port while cooling the heat source 1.

The second air stream forming unit 3 forms a second air stream along which air induced from the second suction port is guided to the discharge port while cooling the heat source 1.

Preferably, the first air stream forming unit 2 comprises at least one fan positioned in the first air stream, and the second air stream forming unit 3 comprises at least one fan positioned in the second air stream.

The sensor unit comprises the first and second temperature sensors 4 and 5, in which the first temperature sensor 4 detects the temperature of suction air induced from the first and second suction ports, and the second temperature sensor 5 detects the temperature of discharge air discharged from the discharge port.

The controller 6 controls the first and second air stream forming units 2 and 3 depending on the temperatures of air measured by the first and second temperature sensors 2 and 3.

Here, the controller 6 comprises a temperature detection unit 10, a temperature difference calculating unit 11, a height determining unit 12, a speed determining unit 13, a memory 14, a driving unit 15, a temperature decrease detection unit 16, and a maximum heat generating period detection unit 17.

The temperature detection unit 10 detects the temperature of the suction air induced from the first and second suction ports, which is detected by the first temperature sensor 4, and the temperature of the discharge air discharged from the discharge port, which is detected by the second temperature sensor 5.

The temperature difference calculating unit 11 calculates a temperature difference between the suction air and the discharge air, and the temperature decrease detection unit 16 detects whether or not the temperature of the suction air detected by the temperature detection unit 10 decreases.

The height determining unit 12 determines a height of the system after comparing the calculated temperature difference with a preset reference for determining the height, and the memory 14 stores information about rotating speeds of the first and second air stream forming units 2 and 3 according to the height.

The speed determining unit 13 determines the rotating speeds of the first and second air stream forming units 2 and 3 according to the height by using the information stored in the memory 14. The driving unit 15 drives the first and second air stream forming units 2 and 3 according to the determined rotating speeds to cool the heat source 1.

The maximum heat generating period detection unit 17 detects the maximum heat generating period of the heat source, and controls the rotating speeds of the first and second air stream forming units 2 and 3 to a lowest rotating speed.

Figure 2:
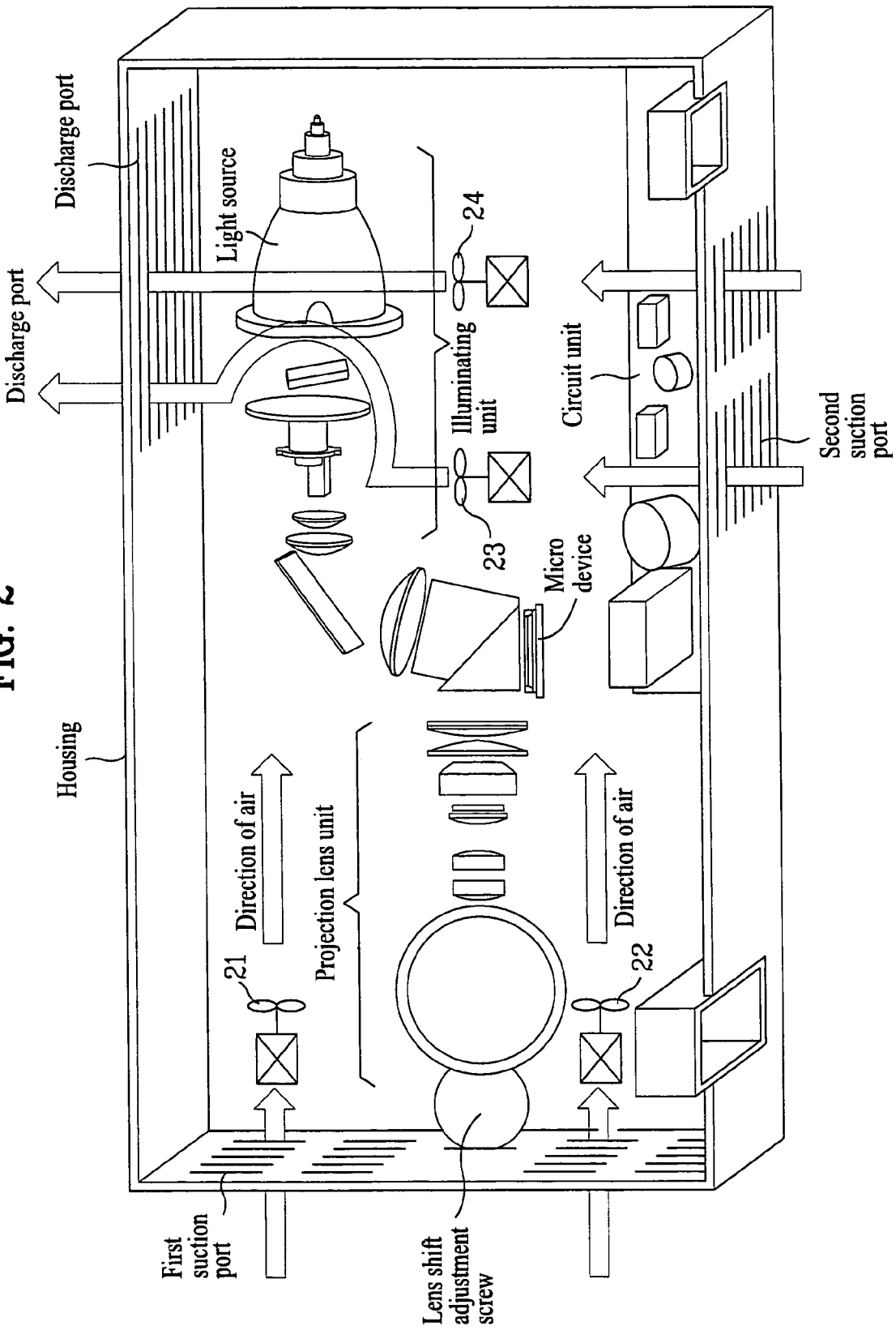
FIG. 2 is a diagram illustrating one example of the cooling system of the thin projector, showing positions of first and second air stream forming units of FIG. 1.

FIG. 2 is a diagram illustrating one example of the cooling system of the thin projector, showing positions of the first and second air stream forming units of FIG. 1.

As shown in FIG. 2, the thin projector generally comprises a projection lens unit, the micro devices, an illuminating unit, the circuit unit, the first air stream forming unit including first and second fans, the second air stream forming unit including third and fourth fans, and the housing which protects these components.

The housing has a vertically upright panel shape. Preferably, the projection lens unit is arranged behind the side surface of the housing, and the illuminating unit is positioned at an upper portion of the housing. Preferably, the circuit unit acts to drive the projection lens unit, the illuminating unit and the micro devices, and is arranged at a lower portion of the housing.

A lens shift adjusting screw to shift the projection lens unit is exposed from the side where the projection lens unit is positioned.

Preferably, the first and second suction ports are formed at the side surface of the housing near the projection lens unit, and at the lower surface of the housing below the circuit unit, respectively, and the discharge port is formed at the upper surface near the illuminating unit.

Preferably, the light source of the illuminating unit is positioned below the discharge unit.

The reason behind this configuration is that, since the light source generates the largest amount of heat among the heat sources, it is positioned near the discharge port in order to achieve rapid and efficient cooling.

With the construction as described above, the thin projector has the fans positioned above and below the projection lens unit, and below the illuminating unit in order to improve cooling efficiency.

Here, the fans comprises a first fan 21 positioned above the projection lens unit, a second fan 22 positioned below the projection lens unit, a third fan 23 positioned below illuminating lenses of the illuminating unit, and a fourth fan 24 positioned below the light source of the illuminating unit.

In other words, the first air stream forming unit 2 may comprise the first and second fans 21 and 22, and the second air stream forming unit 3 may comprise the third and fourth fans 23 and 24.

The first fan 21 is positioned adjacent to the projection lens unit at the upper portion of the housing to form an upper air stream in the housing.

The second fan 22 is positioned adjacent to the projection lens unit at the lower portion of the housing to form a lower air stream in the housing.

The third fan 23 is positioned between the light source among the heat sources and the second suction port to form a vertical air stream from the lower portion to the upper portion of the housing, and the fourth fan 24 is positioned at one side of the third fan 23 to form a bypass air stream from the lower portion to the upper portion of the housing so as to bypass the light source. In some cases, the cooling system may further comprise a fan in a light source module in order to cool only the light source itself.

Thus, air is induced from the first and second suction ports formed at the side surface and the lower surface of the housing via the first and second fans 21 and 22, and then is discharged through the discharge port formed at the upper surface of the housing via the third and fourth fans 23 and 24.

In some cases, according to the present invention, the number of fans can be changed depending on a design of air streams in order to efficiently cool the projector.

A method for controlling the cooling system of the thin projector constructed as described above in accordance with one embodiment of the invention will now be described.

Figure 3:
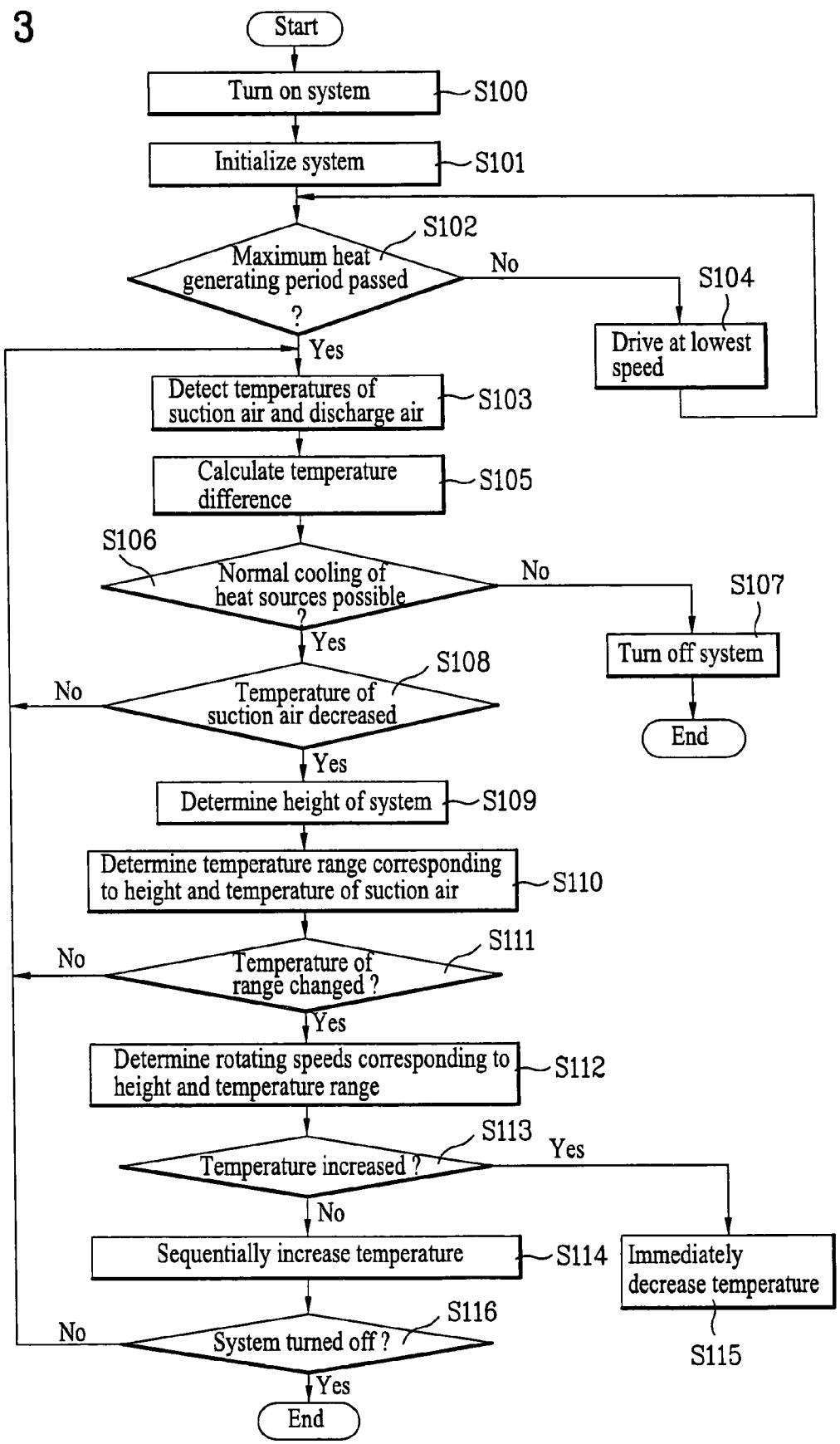
FIG. 3 is a flow diagram illustrating a method for controlling a cooling system of a thin projector in accordance with one embodiment of the present invention.

FIG. 3 is a flow diagram illustrating the method for controlling a cooling system of a thin projector of the invention.

Referring to FIG. 3, first, the system is turned on (S100).

When the system is turned on, the system is initialized (S101). Here, initialization of the system is performed in such a way that a height of the system is set to an initial value of 0, and first and second air stream forming units are driven at a lowest rotating speed. While the system is initialized, heat sources generate heat, and the first and second air stream forming units activate fans thereof.

As the fans of the first and second air stream forming units are activated, air is induced from the outside through first and second suction ports, forming first and second air streams, and is then discharged to the outside through a discharge port. At this time, since the fans of the first and second air stream forming units are driven at a preset rotating speed, for example, a lowest rotating speed, the fans generate a lowest noise.

Next, a maximum heat generating period detection unit determines whether or not a maximum heat generating period of the heat sources has passed (S102).

If the maximum heat generating period has not passed, a speed determining unit allows the first and second air stream forming units to be driven at the preset lowest speed (S104), and if the maximum heat generating period has passed, a temperature detection unit detects the temperatures of suction air and discharge air, respectively (S103).

Then, a temperature difference calculating unit calculates a temperature difference between the suction air and the discharge air, and outputs the temperature difference to a height determining unit (S105).

The height determining unit determines whether or not the temperature difference between the suction air and the discharge air can normally cool the heat sources (S106).

For example, when air is not normally circulated due to blockage of either the suction ports or the discharge port, the temperature difference between the suction air and the discharge air is increased.

In this case, the cooling system of the present invention cannot normally cool the heat sources. Accordingly, if it is determined that the calculated temperature difference between the suction air and the discharge air is higher than a preset highest temperature through comparison of the temperature difference with the preset highest temperature, the height determining unit determines that the temperature difference cannot normally cool the heat sources. On the contrary, if the calculated temperature difference is lower than the preset highest temperature, it determines that the temperature difference can normally cool the heat sources. If the height determining unit determines that the temperature difference cannot normally cool the heat sources, it causes the system to be turned off in order to prevent damage to the system, and shuts down the system (S107).

If the height determining unit determines that the temperature difference can normally cool the heat sources, a temperature decrease detection unit detects whether or not the temperature of the suction air decreases (S108). In other words, when the temperature of the air induced to the thin projector is not stable, and is gradually lowered, the temperature difference between the suction air and the discharge air is further increased, causing the height determining unit to erroneously determine that the height of the system is rapidly increased.

Accordingly, when the temperature decrease detection unit detects that the temperature of the discharge air decreases, detection of the temperature of the suction air and the discharge air (S103) is repeated until the temperature of the suction unit becomes stable.

In addition, when the temperature decrease detection unit detects that the temperature of the discharge air is stable, and does not decrease, the height determining unit determines the height of the system by comparing the temperature difference calculated by the temperature difference calculating unit with first and second preset references for determining the height of the system (S109).

If the temperature difference calculated by the temperature difference calculating unit is higher than the second reference (i.e. the temperature difference>the second reference), the height determining unit determines that the height of the system is high, and sets the height of the system as "2." If the temperature difference is higher than the first reference but lower than the second reference (i.e. the first reference<the temperature difference<the second reference), it determines that the height of the system is middle, and sets the height of the system as "1." If the temperature difference is lower than the first reference (i.e. the temperature difference<the first reference), it determines that the height of the system is low, and sets the height of the system as "0."

Then, a speed determining unit determines a temperature range corresponding to the determined height and the temperature of the suction air using a height-related temperature range table previously stored in a memory (S110).

Next, the speed determining unit determines whether or not a currently determined temperature range is different from a previously determined temperature range (S111).

If the currently determined temperature range is the same as the previously determined temperature range, detection of the temperatures of the suction air and the discharge air (S103) is repeated since there is no need to change the rotating speeds of the first and second air stream forming units. On the contrary, if the currently determined temperature range is different from the previously determined temperature range, the speed determining unit determines a duty ratio of rotating speeds of the first and second air stream forming units corresponding to the determined height and temperature range by using a height and temperature range-related rotating speed duty ratio table stored in the memory (S112).

The, the speed determining unit compares a previous rotating speed with a current rotating speed, and determines whether the rotating speeds of the first and second air stream forming units must be increased or decreased (S113).

If it is required to increase the rotating speeds, a driving unit sequentially increases the rotating speeds of the fans in the first and second air stream forming units according to the duty ratio of rotating speeds (S114).

If it is required to decrease the rotating speeds, the driving unit sequentially decreases the rotating speeds of the fans in the first and second air stream forming units according to the duty ratio of rotating speeds (S115).

Finally, after determining whether the system is turned off, the controller allows the detection of the temperatures of the suction air and the discharge air (S103) to be repeated if the system is not turned off, and shut down the system if the system is turned off.

The present invention provides advantageous effects as follows.

First, the cooling system of the invention has cooling fans which are positioned appropriately for structural characteristics of the thin projector, and form an optimum air stream in the thin projector, thereby enhancing cooling efficiency.

Second, the cooling system of the invention determines a height of the system using a temperature difference between suction air and discharge air, and controls rotating speeds of first and second air stream forming units according to the height and the temperature of suction air, thereby efficiently cooling heat sources while minimizing noise.

Third, the cooling system of the invention forms an air stream in a direction of lamps as a heat source, thereby enhancing cooling efficiency and life time of the lamps in the thin projector.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A cooling system for a thin projector having a panel-shaped housing and a projection lens unit arranged behind a front side of the housing, the front side of the housing being larger than side surfaces of the housing, the cooling system comprising:
   at least one heat source received in the housing;
   first and second suction ports formed in one of the side surfaces and in a lower surface of the housing, respectively;
   a discharge port formed in an upper surface of the housing;
   a first air stream forming unit to form a first air stream along which air induced from the first suction port is guided to the discharge port while cooling the at least one heat source;
   a second air stream forming unit to form a second air stream along which air induced from the second suction port is guided to the discharge port while cooling the at least one heat source;
   a sensor unit to detect respectively a temperature of suction air induced from the first and second suction ports and a temperature of discharge air discharged from via the discharge port; and
   a controller to control the first and second air stream forming units by calculating a temperature difference between the suction air and the discharge air and by determining a height value of the system from the calculated temperature difference, the height value indicating a fixed range of temperature differences determined by comparing the calculated temperature difference with a preset reference value for determining the height value, and the controller determining rotating speeds of the first and second air stream forming units according to the determined height value and the detected temperature of the suction air.

2. The cooling system according to claim 1, wherein the first air stream forming unit comprises at least one fan positioned in the first air stream and wherein the second air stream forming unit comprises at least one fan positioned in the second air stream.

3. The cooling system according to claim 1, wherein the first air stream forming unit comprises:
   a first fan, positioned adjacent to the projection lens unit at an upper portion of the housing, to form an upper air stream in the housing; and
   a second fan, positioned adjacent to the projection lens unit at a lower portion of the housing, to form a lower air stream in the housing.

4. The cooling system according to claim 1, wherein the second air stream forming unit comprises:
   a third fan, positioned between a light source among the at least one heat source and the second suction port, to form a vertical air stream from a lower portion to an upper portion of the housing; and
   a fourth fan, positioned at one side of the third fan, to form a bypass air stream from the lower portion to the upper portion of the housing so as to bypass the light source.

5. The cooling system according to claim 1, wherein the sensor unit comprises:
   a first temperature sensor to measure the temperature of the suction air; and
   a second temperature sensor to measure the temperature of the discharge air.

6. The cooling system according to claim 1, wherein the controller comprises:
   a temperature detection unit to detect respectively the temperature of the suction air and the temperature of the discharge air;
   a temperature difference calculating unit to calculate the temperature difference between the suction air and the discharge air;
   a height determining unit to determine the height value of the system by comparing the calculated temperature difference with a reference value for determining the height value;
   a memory to store tabular information about rotating speeds of the first and second air stream forming units according to the height value;
   a speed determining unit using the tabular information to determine the rotating speeds of the first and second air stream forming units according to height value; and
   a driving unit to drive the first and second air stream forming units according to the determined rotating speeds.

7. The cooling system according to claim 6, further comprising:
   a temperature decrease detection unit to detect whether or not the temperature of the suction air detected by said temperature detection unit decreases; and
   a maximum heat generating period detection unit to detect a maximum heat generating period of the at least one heat source.

8. A method for controlling a cooling system of a thin projector, the cooling system comprising a first air stream forming unit to form a first air stream along which air induced from a first suction port is guided to a discharge port to cool at least one heat source and a second air stream forming unit to form a second air stream along which air induced from a second suction port is guided to the discharge port to cool the at least one heat source, the method comprising:
   detecting respectively a temperature of suction air induced from the first and second suction ports and a temperature of discharge air discharged via the discharge port;
   calculating a temperature difference between the suction air and the discharge air;
   determining a height value of the system from the calculated temperature difference, the height value indicating a fixed range of temperature differences determined by comparing the calculated temperature difference with a preset reference value for determining the height value;
   determining rotating speeds of the first and second air stream forming units according to the determined height value and the detected temperature of the suction air; and
   driving the first and second air stream forming units according to the determined rotating speeds, to cool the at least one heat source.

9. The method according to claim 8, further comprising:
   initializing the system before detecting the temperatures of the suction air and the discharge air, said initializing setting the height value to an initial value of zero.

10. The method according to claim 9, wherein the first and second air stream forming units are driven at a lowest rotating speed when the height value is set to zero.

11. The method according to claim 8, further comprising determining whether or not a maximum heat generating period of the at least one heat source has passed,
wherein, when the maximum heat generating period has not passed, the first and second air stream forming units are driven at a preset lowest speed.

12. The method according to claim 11, wherein the height value is determined after the maximum heat generating period of the at least one heat source is passed.

13. The method according to claim 8, further comprising:
determining whether or not the calculated temperature difference is the temperature difference enabling the normal cooling; and
shutting down the system when it is determined that the calculated temperature difference is not a temperature difference enabling the normal cooling.

14. The method according to claim 8, further comprising:
determining whether or not the temperature of the suction air is lowered,
wherein, when the temperature of the suction air is lowered, said temperature detecting and said temperature difference calculating is repeated.

15. The method according to claim 8, wherein the rotating speeds are determined based on a height-value- and temperature-range-based rotating speed duty ratio table.

16. The method according to claim 8, wherein the height value of the system is determined depending on first and second reference values for determining the height value of the system, the first and second reference values determining at least three different ranges of temperature differences, the determined height value falling into exactly one of the at least three different ranges.

17. The method according to claim 8, wherein said rotating speed determining comprises:
determining, using a height-value-based temperature range table, a temperature range corresponding to the determined height value and the detected temperature of the suction air; and
determining whether or not a currently determined temperature range is different from a previously determined temperature range.

18. The method according to claim 17, wherein when it is determined that the currently determined temperature range is not different from the previously determined temperature range, said temperature detecting and said temperature difference calculating is repeated.

19. The method according to claim 17, further comprising:
comparing current rotating speeds with previous rotating speeds of the first and second air stream forming units, respectively, to determine a change in the rotating speeds of the first and second air stream forming units,
wherein, when said comparing determines to increase the rotating speeds of the first and second air stream forming units, the rotating speeds of the first and second air stream forming units are increased sequentially, and
wherein, when said comparing determines to decrease the rotating speeds of the first and second air stream forming units, the rotating speeds of the first and second air stream forming units are immediately decreased to a preset rotating speed.

20. The method according to claim 8, further comprising:
repeating said temperature detecting and said temperature difference calculating after driving the first and second air stream forming units to cool the at least one heat source.

21. The method according to claim 17, wherein the rotating speeds are newly determined only when the currently determined temperature range is different from the previously determined temperature range.

* * * * *